US012675486B2

(12) United States Patent
Wang et al.

(10) Patent No.: US 12,675,486 B2
(45) Date of Patent: Jul. 7, 2026

(54) INDICATOR QUERY METHOD AND SYSTEM, ELECTRONIC DEVICE AND STORAGE MEDIUM

(71) Applicant: ZTE CORPORATION, Shenzhen (CN)

(72) Inventors: Aijun Wang, Shenzhen (CN); Kaixia Feng, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 19/099,210

(22) PCT Filed: Feb. 20, 2023

(86) PCT No.: PCT/CN2023/077194
§ 371 (c)(1),
(2) Date: Jan. 28, 2025

(87) PCT Pub. No.: WO2024/021581
PCT Pub. Date: Feb. 1, 2024

(65) Prior Publication Data
US 2026/0030246 A1      Jan. 29, 2026

(30) Foreign Application Priority Data
Jul. 28, 2022    (CN) .......................... 202210901008.X

(51) Int. Cl.
*G06F 16/2455* (2019.01)
(52) U.S. Cl.
CPC .............................. *G06F 16/24564* (2019.01)
(58) Field of Classification Search
CPC ........... G06F 16/24564; G06F 11/3409; G06F 16/9535
See application file for complete search history.

(56) References Cited

U.S. PATENT DOCUMENTS

2016/0105338 A1* 4/2016 Fletcher ................ G06F 16/903
709/224
2018/0285439 A1 10/2018 Li et al.

FOREIGN PATENT DOCUMENTS

CN        101345654 A      1/2009
CN        108415964 A      8/2018
(Continued)

OTHER PUBLICATIONS

International Search Report for corresponding application PCT/CN2023/077194 filed Feb. 20, 2023; Mail date May 30, 2023.
(Continued)

*Primary Examiner* — Hau H Hoang
(74) *Attorney, Agent, or Firm* — CANTOR COLBURN LLP

(57) ABSTRACT

The present disclosure relates to an indicator query method and system, an electronic device and a storage medium, which are applied to the technical field of data processing. The method comprises: acquiring an indicator query instruction, wherein the indicator query instruction carries an indicator name of a target indicator and target feature information about the target indicator; determining target operation information about the target indicator based on the indicator name, wherein the target operation information comprises a target operation parameter and a target operation rule; determining, from an indicator pre-computation data set, indicator intermediate data corresponding to the target operation parameter and the target feature information, wherein the indicator pre-computation data set is obtained by pre-computation based on original indicator data; determining a query result of the target indicator based on the indicator intermediate data and the target operation rule.

18 Claims, 4 Drawing Sheets acquiring an indicator query instruction, wherein the indicator query instruction carries an indicator name of a target indicator and target feature information about the target indicator — 201 determining target operation information about the target indicator based on the indicator name, wherein the target operation information comprises a target operation parameter and a target operation rule — 202 determining, from an indicator pre-calculation data set, indicator intermediate data corresponding to the target operation parameter and the target feature information, wherein the indicator pre-calculation data set is obtained by pre-computation based on original indicator data — 203 determining a query result of the target indicator based on the indicator intermediate data and the target operation rule — 204

(56)            References Cited

FOREIGN PATENT DOCUMENTS

| | | |
|---|---|---|
| CN | 110019332 A | 7/2019 |
| CN | 114358596 A | 4/2022 |

OTHER PUBLICATIONS

Written Opinion for corresponding application PCT/CN2023/077194 filed Feb. 20, 2023; Mail date May 30, 2023.

* cited by examiner

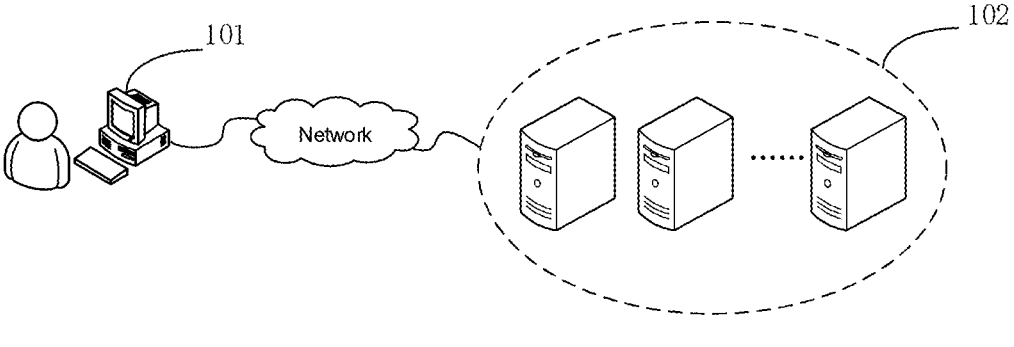

Fig. 1

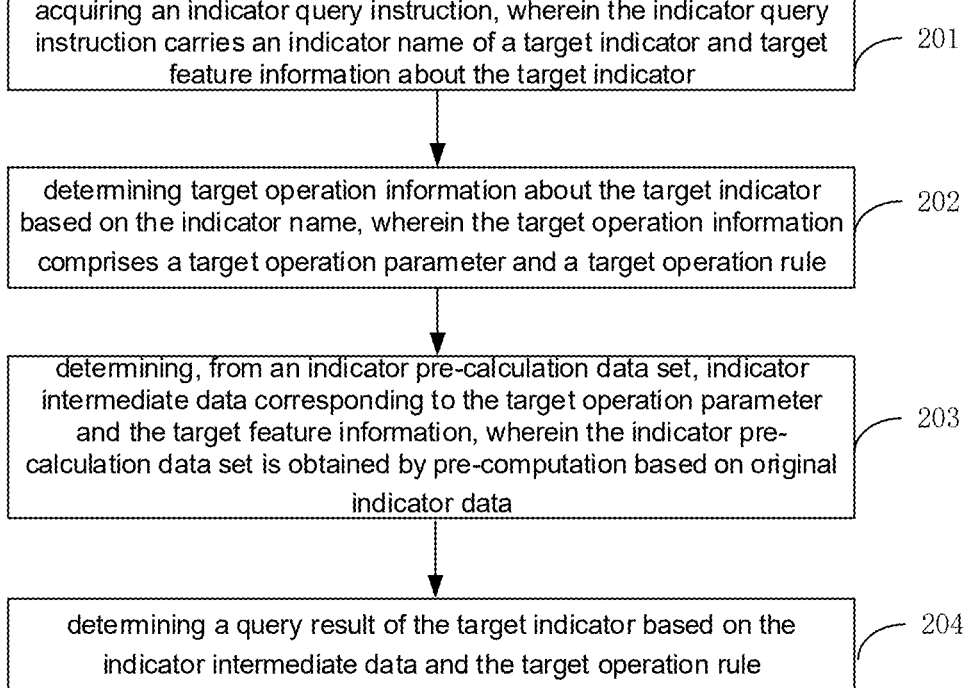

acquiring an indicator query instruction, wherein the indicator query instruction carries an indicator name of a target indicator and target feature information about the target indicator — 201 determining target operation information about the target indicator based on the indicator name, wherein the target operation information comprises a target operation parameter and a target operation rule — 202 determining, from an indicator pre-calculation data set, indicator intermediate data corresponding to the target operation parameter and the target feature information, wherein the indicator pre-calculation data set is obtained by pre-computation based on original indicator data — 203 determining a query result of the target indicator based on the indicator intermediate data and the target operation rule — 204

Fig. 2

INDICATOR QUERY METHOD AND SYSTEM, ELECTRONIC DEVICE AND STORAGE MEDIUM

CROSS-REFERENCE TO RELATED APPLICATION

This disclosure is a national stage filing under 35 U.S.C. § 371 of international application number PCT/CN2023/077194, filed on Feb. 20, 2023, which is claims priority to Chinese Patent Application No. CN202210901008. X entitled "INDICATOR QUERY METHOD, SYSTEM, ELECTRONIC DEVICE, AND STORAGE MEDIUM" filed on Jul. 28, 2022, the entire disclosure of which is incorporated herein by reference.

TECHNICAL FIELD

The present disclosure relates to the field of data processing technologies, and in particular, to an indicator query method and system, an electronic device, and a storage medium.

BACKGROUND

Mass data of the performance of a wireless network element is usually managed and analyzed based on a database platform, and indicator analysis and exploration are important operations of network operation and maintenance. When network element performance data of multiple modes (for example, 2G, 3G, 4G and 5G collectively manage) are managed at the same time, a large number of indicators are introduced. Generally, when a certain indicator is queried, relevant indicator information required for calculating the indicator needs to be queried from a database platform, and the indicator information is computed according to an operation mode of the indicator. This mode has the technical problems of complex indicator query process and low query efficiency.

SUMMARY

The present disclosure provides an indicator query method and system, an electronic device and a storage medium, which are used for solving the problems of complex indicator query process and low query efficiency in some situations.

According to a first aspect, the present disclosure provides an indicator query method, comprising: acquiring an indicator query instruction, wherein the indicator query instruction carries an indicator name of a target indicator and target feature information about the target indicator; determining target operation information about a target indicator based on an indicator name, wherein the target operation information comprises a target operation parameter and a target operation rule; determining, from an indicator pre-computation data set, indicator intermediate data corresponding to the target operation parameter and the target feature information, wherein the indicator pre-computation data set is obtained by pre-computation based on original indicator data; determining a query result of the target indicator based on the indicator intermediate data and the target operation rule.

According to a second aspect, the present disclosure provides an indicator query system, comprising: a network element data analysis module and an indicator pre-computation management module. A network element data analysis module configured to acquire an indicator query instruction, wherein the indicator query instruction carries an indicator name of a target indicator and target feature information about the target indicator; an indicator pre-computation management module, configured to determine target operation information about a target indicator based on an indicator name, wherein the target operation information comprises a target operation parameter and a target operation rule; determining, from an indicator pre-computation data set, indicator intermediate data corresponding to the target operation parameter and the target feature information, wherein the indicator pre-computation data set is obtained by pre-computation based on original indicator data; determining a query result of the target indicator based on the indicator intermediate data and the target operation rule.

According to a third aspect, the present disclosure provides an electronic device, comprising: a processor, a communication interface, a memory, and a communication bus, wherein the processor, the communication interface, and the memory complete communication with each other through the communication bus; the memory is configured to store a computer program; the processor is configured to execute the program stored in the memory to implement the method for querying an indicator in the first aspect.

According to a fourth aspect, the present disclosure provides a computer readable storage medium, storing a computer program, wherein the computer program is configured to, when executed by a processor, implement the method for querying an indicator according to the first aspect.

BRIEF DESCRIPTION OF THE DRAWINGS

The accompanying drawings, which are incorporated herein and form a part of the description, illustrate embodiments consistent with the present disclosure and together with the description, serve to explain the principles of the disclosure.

To describe the technical solutions in the present disclosure or in the prior art more clearly; the following briefly introduces the accompanying drawings required for describing the embodiments or the prior art. Apparently, persons of ordinary skill in the art may still derive other drawings from these accompanying drawings without creative efforts.

FIG. 1 is an application scenario diagram of a method for querying for indicators according to an embodiment of the present disclosure;

FIG. 2 is a flowchart of a method for querying for indicators according to an embodiment of the present disclosure;

DETAILED DESCRIPTION OF THE EMBODIMENTS

Figure 3:
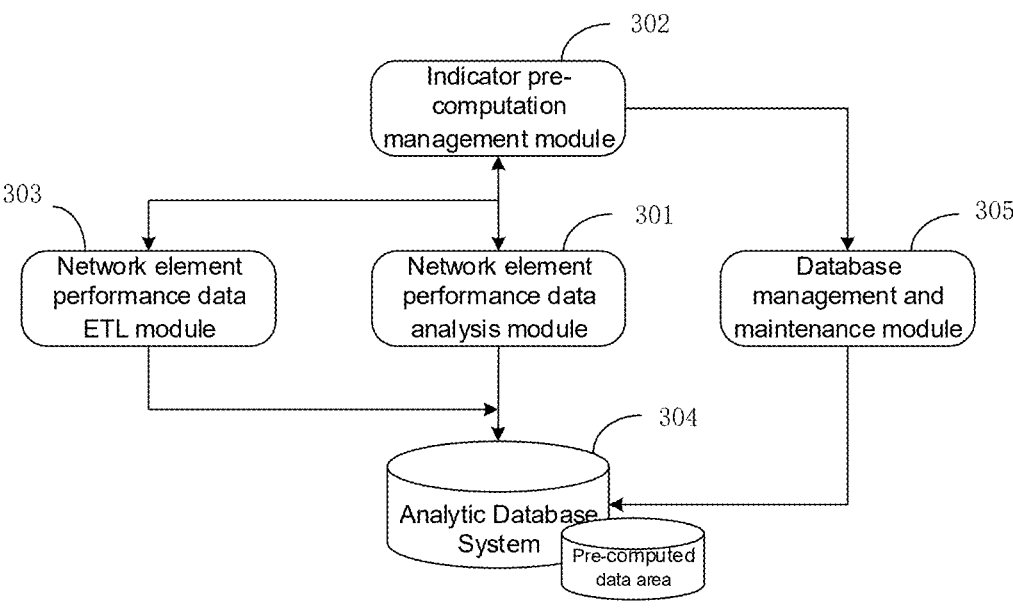
FIG. 3 is a structural diagram of an indicator query system according to an embodiment of the present disclosure.

To make the objectives, technical solutions, and advantages of the present disclosure clearer, the following clearly and completely describes the technical solutions in the present disclosure with reference to the accompanying drawings in the present disclosure. Apparently, the embodiments to be described are merely a part rather than all of the embodiments of the present disclosure. All other embodiments obtained by persons of ordinary skill in the art based on the embodiments of the present disclosure without creative efforts shall belong to the scope of protection of the present disclosure.

Before describing the present disclosure in further detail, nouns and terms referred to in the present disclosure are explained. The nouns and terms referred to in the present disclosure are applicable to the following explanations.

ETL, which is an abbreviation for Extract-Transform-Load in English, is used to describe a process of extracting, transforming, and loading data from a source end to a destination end. ETL is frequently used in data warehouses, but its objects are not limited to data warehouses.

File Transfer Protocol (FTP) is a standard protocol for file transfer over a network.

Structured Query Language (SQL), which is a special purpose programming language, is a database query and programming language, and is used for accessing data, querying, updating and managing a relational database system.

A Data Definition Language (DDL) is a language for describing a real-world entity to be stored in a database.

Java Database Connectivity (JDBC) is an application programming interface used in Java language to specify how a client program accesses a database, providing a method such as querying and updating data in the database.

Mass data of the performance of a wireless network element is usually managed and analyzed based on a database platform, and indicator analysis and exploration are important operations of network operation and maintenance. When network element performance data of multiple modes (for example, 2G, 3G, 4G and 5G collectively manage) are managed at the same time, a large number of indicators are introduced. Generally, when a certain indicator is queried, relevant indicator information required for calculating the indicator needs to be queried from a database platform, and the indicator information is computed according to an operation mode of the indicator. In this manner, because the complexity of an indicator is difficult to control, a technical problem of complex indicator query process and low query efficiency is further caused.

An indicator inquiry method is provided according to an embodiment of the present disclosure. In an exemplary embodiment, the described indicator inquiry method can be applied in a hardware environment composed of the terminal 101 and the server 102 as shown in FIG. 1. As shown in FIG. 1, a server 102 is connected to a terminal 101 via a network, and can be used for providing a service (such as an application service) for the terminal or a client installed on the terminal; a database can be set on the server or independently of the server, and is used for providing a data storage service for the server 102; the described network comprises, but is not limited to, a wide area network, a metropolitan area network or a local area network; and the terminal 101 is not limited to a PC, a mobile phone, a tablet computer, etc.

The method for querying an indicator according to the present disclosure may be executed by the server 102, may also be executed by the terminal 101, and may also be executed by both the server 102 and the terminal 101. The terminal 101 may execute the method for querying an indicator according to the present disclosure, or a client installed thereon.

Taking the terminal executing the indicator query method of the present disclosure as an example, FIG. 2 is a schematic flowchart of an optional indicator query method according to the present disclosure, and as shown in FIG. 2, the flow of the method may include Steps 201 to 204 below.

Step 201: acquire an indicator query instruction, wherein the indicator query instruction carries an indicator name of a target indicator and target feature information about the target indicator.

In some embodiments, the indicator query instruction may be triggered after a user inputs indicator-related information to be queried in the query interface, or the indicator-related information to be queried is selected in a pull-down menu option in the query interface, and then the indicator query instruction is generated.

In an exemplary embodiment, the indicator-related information may be the indicator name and target feature information of the indicator, wherein the target feature information may include, but is not limited to, an object type including the indicator and acquisition time information of the indicator.

Step 202: determining target operation information about the target indicator based on the indicator name, wherein the target operation information comprises a target operation parameter and a target operation rule.

In some embodiments, for each indicator, operation information corresponding to each indicator is stored in a database; therefore, after an indicator name of a target indicator is acquired, target operation information corresponding to the indicator name may be determined from the background based on the indicator name.

A target operation parameter in target operation information may be parameter information required by a computation indicator, and a target operation rule may be an operation manner of the target operation parameter, for example, addition, subtraction, multiplication and division.

Step 203: determining, from an indicator pre-computation data set, indicator intermediate data corresponding to the target operation parameter and the target feature information, wherein the indicator pre-computation data set is obtained by pre-computation based on original indicator data.

In some embodiments, after a target operation parameter is obtained, a search is first performed in an indicator pre-computation data set, and it is determined whether target feature information and indicator intermediate data corresponding to the target operation parameter exist; if so, the target indicator may be subsequently computed based on the indicator intermediate data; and if not, the search is performed in indicator original data.

In an optional embodiment, in order to improve the efficiency of indicator lookup, before Step 202, the method further comprises: determining that the indicator pre-computation data set corresponding to the target feature information exists.

In some embodiments, an indicator pre-computation data set corresponding to target feature information is determined first, and when the indicator pre-computation data set exists, lookup is performed in the indicator pre-computation data set; when there is no indicator pre-computation data set, there is no need to search in the indicator pre-computation data set, but instead, the indicator pre-computation data set is directly searched in the original data set. In this way; the query time of corresponding indicator data can be saved, and the situation where the indicator pre-computation data set is still searched in the indicator pre-computation data set when there is no indicator pre-computation data set can be avoided.

With regard to different pieces of feature information, indicator pre-computation data sets are different; therefore, by means of firstly determining an indicator pre-computation data set corresponding to target feature data from a plurality of indicator pre-computation data sets, a process of querying all the indicator pre-computation data sets is avoided, and query time is saved.

In an exemplary embodiment, there are various methods for determining that an indicator pre-computation data set corresponding to target feature information exists, for example, the method may be as follows: determining whether the target feature information satisfies a pre-computation condition; in cases where the target feature information satisfies the pre-computation conditions, determine that the indicator pre-computation data set exists.

In some embodiments, when establishing the indicator pre-computation data set, the feature information may be established based on the original indicator data after satisfying certain pre-computation conditions. On this basis, a determination is made by means of target feature information, and in cases where the pre-computation condition is satisfied, it is determined that there is an indicator pre-computation data set corresponding thereto.

It can be understood that the foregoing pre-computation condition may be that the target feature information includes an indicator pre-computation identifier, the occurrence frequency of the indicator is higher than a preset frequency, and the computation complexity of the indicator is higher than the preset complexity.

The indicator pre-computation identifier may be pre-set for the indicator and is used for indicating a query identifier of the indicator which needs to be pre-computed. The frequency of occurrence of the indicator may be obtained by counting the number of times that the indicator appears in the query every day.

The computation complexity of the indicator may comprise calculating the number of times that the indicator needs to be computed, for example, indicator KPI=C1+C2*C3+C4, and the complexity thereof is 3, comprising two times of computation and one time of multiplication operation, wherein C1, C2, C3 and C4 are all target computation parameters required for computing an indicator. The computational complexity of an indicator may also include the number of line records computed from the results of the indicator. For example, if KPI=C1, where C1 is aggregated from 3 records, the complexity is 3.

In an exemplary embodiment, the compression type counter reported by the network element may include a plurality of sub-counters. A compression type counter is denoted C1 (C11, C12, C1n), n being the indicator position of C1.

In order to guarantee the stability of the stored database table, the compression type counter is generally stored in a row-based manner, and the indicator subscript of the counter is stored in a separate column. As shown in the following Table 1, the indicator of C1 is n, at the time T1, the correlation record number of obj is 1 is n, and therefore the complexity of the aggregate value of C1 is the record row number n:

TABLE 1

| Acquisition time | Object | Indicator value | C1 |
|---|---|---|---|
| T1 | 1 | 1 | 10 |
| T2 | 1 | . . . | . . . |
| T3 | 1 | n | 30 |
| T4 | 2 | 1 | X |

The complexity of the indicator including the C1 counter is the sum of the complexity of all counters. The complexity of a query template is the sum of the complexity of all included indicators. By means of the complexity of the query template, the distribution of all the complexity of the templates of a data management system can be computed, and guidance is provided for template optimization.

In an exemplary embodiment, the weight may also be assigned based on the target feature information, and further computed to obtain a feature score. In addition, when determining whether to search in the pre-computation data set, the feature score can be directly used for searching, so as to save searching time.

In an optional embodiment, a process of pre-calculating an indicator pre-computation data set based on original indicator data comprises: acquiring the original indicator data, wherein the original indicator data comprises original feature information about an indicator and original operation information about the indicator; in cases where the original feature information satisfies a pre-computation condition, pre-calculating the original operation information to obtain at least one piece of the indicator intermediate data; determining a set of corresponding relationships between indicator intermediate data and the original feature information as the indicator pre-computation data set.

In some embodiments, the original indicator data may be obtained by establishing a relationship between model elements from a business perspective when the system is initialized. Wherein the model element contains a network element standard, a managed object (i.e. an object type), a measurement type, a key performance indicator (i.e. an original indicator name), a counter (i.e. an original operation parameter), a table definition corresponding to the database, etc. Further definition of a model element mapped to a database object, such as a table of a database, a field type, or a UDF (User Defined Feature, user defined feature) definition.

In an exemplary embodiment, the mapping of model elements to database objects can be seen in Table 2 below.

TABLE 2

| Model element | Element definition specification | Database object |
|---|---|---|
| Network element mode (Product) | 2/3/4/5G network elements, such as: NR, ltetdd, ltefdd, umts, gsm | The service data classification fields of the database, such as the data of ltetdd and ltetdd, may be stored in the same table. |
| Managed object (MOT) | Objects under network elements of different modes, such as an | Spatial Dimension Field Corresponding to Database (variable length string type |

TABLE 2-continued

| Model element | Element definition specification | Database object |
|---|---|---|
| | RNC (Radio Network Controller), a DU (Distributed Unit) cell, a DU physical cell, a CU (Centralized Unit) cell, a cell type, an LTE-NR adjacency relationship, etc.; | description) |
| Measurement type (PO) | Measurement service classifications attributed to different mots, such as cell RRC (Radio Resource Control) connection statistics, DU cell resource statistics, etc. | Table corresponding to database |
| Counter | Measurement information under a specific measurement type. | Corresponding Database Table Field, Number Type Description |
| Key Performance Indicator (KPI) | KPIs are key metrics that have a business meaning and can be the result of formulaic operations with multiple counters . . . | Corresponding to the database table field or obtained through computation by a UDF |

In an exemplary embodiment, after the data in Table 2 is obtained, the DDL of the database may be generated based on the information in the 'database object' in Table 2, the DDL is connected to the database through the JDBC, and the object of the database is created.

The original feature information of the pointer may be the managed object and the query time of the pointer. The original operation information of the indicator may be a target original operation parameter and an original operation rule. The pre-computation condition satisfied by the original feature information may be the same as the pre-computation condition satisfied by the target feature information, and may be that the original feature information includes an indicator pre-computation identifier, the occurrence frequency of the indicator is higher than a pre-set frequency, and the computation complexity of the indicator is higher than the pre-set complexity.

After the original feature information satisfies the pre-computation condition, pre-computation may be performed based on the original operation information of the indicator, so as to obtain indicator intermediate data.

In an optional embodiment, the original operation information includes an original operation parameter and an original operation rule between the original operation parameters; pre-computing original operation information to obtain at least one piece of the indicator intermediate data, comprising: decomposing the original operation information into at least one sub-operation according to an original operation rule; determining an operation result of each sub-operation as the indicator intermediate data.

The pre-computation of the original computation information of the indicators may be decomposing the pre-computed indicators into a plurality of intermediate indicators which can support aggregation computation.

In an exemplary embodiment, an indicator KPI=(C1+C2)/(C3+C4) is decomposed, and may be KPI=PI1/PI2, PI1=C1+C2, and PI2=C3+C4. C1, C2, C3 and C4 are all original operation parameters, and PI1 and PI2 are all target operation parameters.

Step 204: determining a query result of the target indicator based on the indicator intermediate data and the target operation rule.

In some embodiments, after the indicator intermediate data is determined, the indicator intermediate data may be operated based on a target operation rule, so as to obtain a query result of the target indicator.

In an alternative embodiment, for some target indicators, all target operational parameters may not be included in the pre-indicator computation data set, and for some target operational parameters, it may be the original operational parameters in the original indicators data. Based on this, before a query result of a target indicator is determined, original operation data corresponding to the original operation parameter corresponding to target feature information also needs to be acquired from the original indicator data, and then the query result of the target indicator is determined based on the original operation data, the intermediate indicator data and the target operation rule.

In an exemplary embodiment, an indicator KPI=PI3+C4, PI3-C5*C6, wherein PI3 is an operation parameter in an indicator pre-computation data set, and C4, C5 and C6 are original operation parameters in indicator original data.

Provided is an indicator query method. By means of indicator usage information collection, indicator data processing process information collection and data acceleration layer construction, indicator query efficiency improvement and system overall resource reduction are achieved by means of pre-computation. The indicator analysis and exploration queries a database data table for data of a corresponding column from a time and object dimension, and calculates a final result based on an indicator expression. The indicator usage information includes the frequency of use of the indicator, the associated time and object range, and the query-corresponding SQL statements. Indicator Data Processing Process Information Collection, which quantifies the yield of pre-computed methods through analysis of historical data. Data processing process information, comprising a processing efficiency and a corresponding resource indicator of an infrastructure. Construction of a data acceleration layer, extracting a sub-indicator from an original indicator, preparing a sub-indicator result in advance by means of a pre-computation method, and calculating the original indicator result based on the sub-indicator.

Information such as frequency, time and object of an indicator query operation is collected, an initial indicator is decomposed and an intermediate indicator is extracted, and an intermediate acceleration layer (i.e. an indicator pre-computation data set) of indicator data is dynamically established based on the indicator complexity, thereby improving the indicator query efficiency. Therefore, the data management platform provides higher throughput capability to the outside based on the same resource, and improves user experience at the same time.

Based on the same conception, the present disclosure provides an indicator query system. For the specific implementation of the system, reference may be made to the description of the method embodiment, and a repeated description is not repeated. As shown in FIG. 3, the system mainly comprises: a network element data analysis module 301 and an indicator pre-computation management module 302.

A network element data analysis module 301 configured to acquire an indicator query instruction, wherein the indicator query instruction carries an indicator name of a target indicator and target feature information about the target indicator; an indicator pre-computation management module 302 configured to determine target operation information about a target indicator based on an indicator name, the target operation information comprising a target operation parameter and a target operation rule; determining, from an indicator pre-computation data set, indicator intermediate data corresponding to the target operation parameter and the target feature information, wherein the indicator pre-computation data set is obtained by pre-computation based on original indicator data; determining a query result of the target indicator based on the indicator intermediate data and the target operation rule.

In an exemplary embodiment, the indicator pre-computation management module collects a definition of a typical indicator query template or report template from the network element data analysis module, and performs an indicator complexity analysis on the high-frequency indicator or important template. Indicator decomposition is performed on complex indicators, pre-computed intermediate indicators supporting combination computation are extracted, and a table of a database of a data acceleration layer is created in combination with queried time and object information.

In an exemplary embodiment, the system further comprises a network element performance data ETL module 303, in which network element data is reported to a common FTP server, and the network element performance data ETL module is used for downloading data from the FTP server, and then loading same to an analysis type database system 304. The data of the pre-computed indicators are computed in advance and stored in the pre-computed data area.

The indicator pre-computation management module is also used for driving the network element performance data ETL module to calculate intermediate indicator data and store same in a pre-computation area of a database. At the same time, a basis is provided for querying whether the indicator queries the pre-computation data, and a query algorithm of the network element performance data analysis module is generated. The module also provides a pre-computation indicator exit mechanism, and pre-calculates an indicator with a low hit rate of indicator data to execute a fallback operation.

In an exemplary embodiment, the network element performance data analysis module is further used for providing a performance data analysis service, and performing statistics and analysis on mass data based on the database system. At the same time, the definition of the indicator query, the occurrence time, the performance indicator of the query, and the SQL sentence of the query are reported to the indicator pre-computation management module.

In an exemplary embodiment, the system further comprises a database management and maintenance module 305, wherein the module maintains database metadata in a model-driven manner, such as maintenance of tables, UDFs, indicators, and creation and maintenance of pre-computed database related objects.

The above-mentioned analysis-type database system may be a distributed relational database system, which is used for storing and managing network element performance data and supporting massive data analysis.

In a specific embodiment, the indicator query system further comprises the following content.

First, the system is initialized.

In the initialization process, a network element performance model is modeled, and a relationship between model elements is established from a service perspective, wherein the model elements comprise a network element standard, a managed object, a measurement type, a key indicator, a counter, a table definition corresponding to the database, etc. and establishing a database object using a model driving mode, wherein a database management and maintenance module parses a network element performance data model and maps same into a database object, such as a table and a UDF function, and reference can be made to table 2 for details.

Second, the system operates normally.

During the operation of a system, a typical indicator query is extracted: a network element performance data analysis module collects an indicator, filtering condition information and corresponding SQL statement related to a floor query and a routine query, and reports same to an indicator pre-computation management module.

In an exemplary embodiment, the network element performance data analysis module reports the service query operation, the corresponding SQL statement and the query operation efficiency. The detailed description can be found in Table 3.

TABLE 3

| Acquisition Dimension | Detailed description |
|---|---|
| Query definition | Template query/presence query/routine query, comprising a query identifier, an indicator id, an object type (mot) and a filtering condition |
| SQL statement | Table, time and object filtering conditions to query |
| Inquiry operation efficiency | Metrology by operating time, providing a reference for manually specifying whether or not indicator pre-computation is supported |

A pre-computation indicator model is established, mainly comprising the following process: first of all, indicator pre-computation features are extracted: an indicator pre-computation management module performs incremental analysis based on historical data such as the usage frequency, importance and complexity of each indicator to give a pre-computation feature score of each indicator, and determines the priority of the indicator pre-computation. In addition, in combination with a time dimension and an object dimension supporting query analysis of a pre-computation indicator, a range of pre-computed data is obtained, and a pre-computation query evaluator example of a running period is generated. Secondly, a pre-computed middle-level indicator is extracted: the indicator supporting pre-computation is further decomposed, and the pre-computed middle-level indicator is abstracted. The result of the original indicator is obtained by calculating through an interlayer indicator, and the interlayer indicator needs to support an aggregation operation, such as a maximum value max, a minimum value min, an average value avg, and a sum value sum, and at the same time, a plurality of indicators can multiplex data of the pre-computed indicator of the inter-layer. Then the coordinated database management and maintenance module creates the intermediate database table.

In an exemplary embodiment, an indicator pre-computation management module parses an indicator expression, a query occurrence time, a filtering time and object information in a query definition in table 3, and constructs an indicator pre-computation model in table 4.

TABLE 4

| Field type | Indicator attribute | Detailed description |
|---|---|---|
| Feature field | Query name | Query identifier to which indicator belongs |
| | Appearance frequency | Number of times per day criteria occurred in the query |
| | VIP identity | The user specifies whether the pre-computation is supported, which reflects the importance of the indicator |
| | Column complexity | The number of indicator expression operations. For example, the complexity of KPI = C1 + C2*C3 + C4 is 3, in which there are three operations of + and * |
| | Line complexity | The number of entries in a row is computed as the result of the indicator. If KPI = C1 is aggregated from 3 records, the complexity is 3. |
| Feature score | Complexity | Calculating a score of the feature based on the query field, and determining a pre-computed priority. The user specifies that the pre-computed indicator has the highest priority. |
| Precomputed indicator | Intermediate pointer | The pre-computed indicator is decomposed into a plurality of intermediate indicators that can support aggregation operations. For example, KPI = (C1 + C2)/(C3 + C4), the decomposition formula is KPI = PI1/PI2, PI1 = C1 + C2, PI2 = C3 + C4 |
| | Dimension information | Time and object range needed for pre-computation |

The occurrence frequency may be the number of times of occurrence of indicator queries in each day, and is represented by $F(KPIn)$. A rule can be defined that for N consecutive days, an indicator of $F>M$ needs to be added to the pre-computed model.

VIP ID: an indicator of a user's attention efficiency to a specific query, which is marked as VIP, has an indicator of VIP attribute, and is preferably added into a pre-computation model.

Column complexity: an indicator expression is finally decomposed into a counter, and a result is obtained by means of an arithmetic operation of the counter. Wherein the number of times that the operator appears is a column complexity, which is represented by $OC(KPIn)$; operational symbols such as plus sign (+), minus sign (−), multiplier sign (*) and dividing sign (/).

The result of row complexity: the indicator may be based on the result of N-row record aggregation, and is represented by $Or(KPIn)$.

Figure 4:
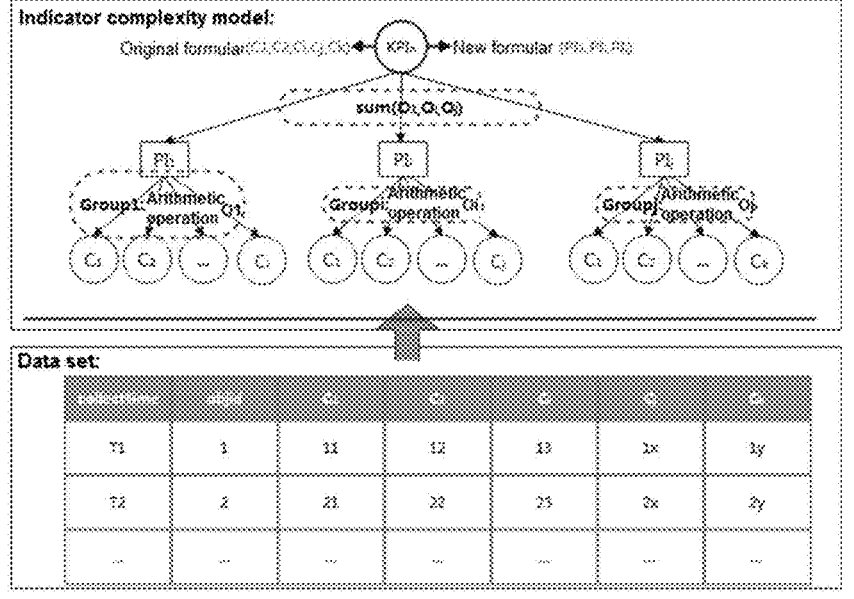
FIG. 4 is a schematic diagram of a complexity model according to an embodiment of the present disclosure.

Complexity: an indicator is finally mapped into an SQL sentence, and a final output result is computed in a database by using M rows and N columns of data sets. Indicator complexity=column complexity+row complexity, represented by $O(KPIn)$, and the complexity model is shown in FIG. 4.

Figure 5:
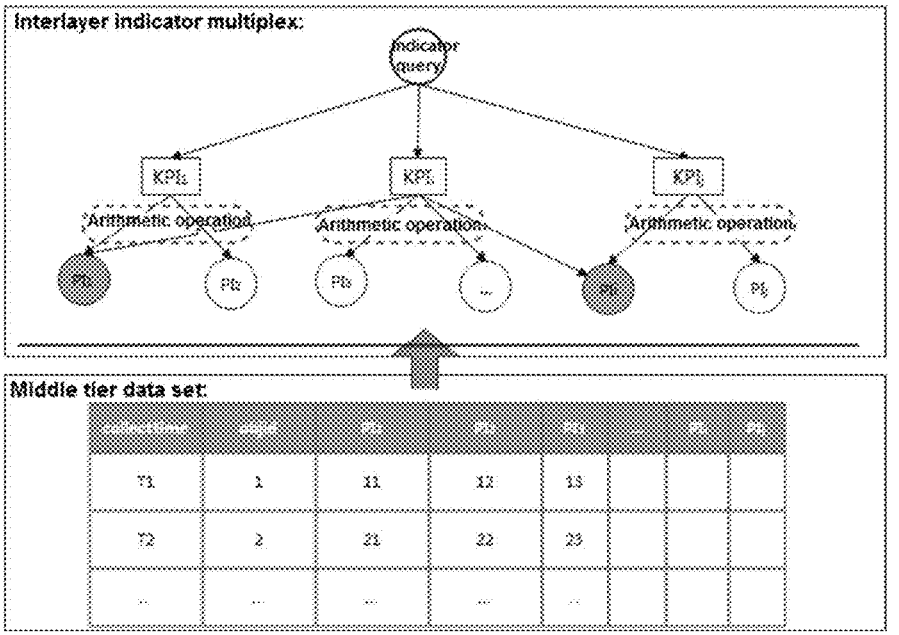
FIG. 5 is a schematic diagram of an indicator query process according to an embodiment of the present disclosure.

Intermediate indicators: indicators are decomposed into indicators that need to be pre-computed, and an aggregation operation can be supported. The KPIn is decomposed into PI1. . . PIi, where the PIi supports an aggregation operation, and the PIi is represented by Formula (C1, C2. . . Cj). Each Group in FIG. 4 has a corresponding complexity. When O(Group) is greater than a specific threshold, for example, O(Group)>10, PIi is reserved as an intermediate indicator. An original indicator may obtain a result by multiplexing values of intermediate indicators. As shown in FIG. 5, indicator query contains original indicators (KPI1, KPIi, KPIj). An original indicator intermediate indicator (PI) is obtained through computation, and is multiplexed with values of a plurality of KPI-dependent PIs for the computation of a KPI.

Dimension information: refers to a data range of a query, such as a time span and an object granularity. A pre-computed-indicator intermediate table of the database is created based on the dimension information, and the time dimension may support 15 minutes, hours, days, and the like. The object dimensions may support neighbouring cells, cells, network elements, etc.

Generating pre-computed data; and an indicator pre-computation management module coordinating a network element performance data ETL module to pre-calculate an intermediate-layer indicator supporting the pre-computed indicator, and loading the data into a data pre-computation area in a database.

Using pre-computed data; an indicator pre-computation management module evaluating an indicator of a target query and a query condition by means of a pre-computation query evaluator, so as to generate a new execution plan, and returning a final query result in combination with the pre-computed data.

In an exemplary embodiment, the network element performance data ETL module generates pre-computed data based on an indicator pre-computation model table of table 4, and loads the pre-computed data to a database intermediate table, which is represented by MT(Mot, T, PIi). Where Mot is the object dimension and T is the time dimension. The real-timeliness of the data in the intermediate table is ensured by an ET (Extract/Transform) link of the data, and the data in the intermediate table is updated in an incremental manner.

Figure 6:
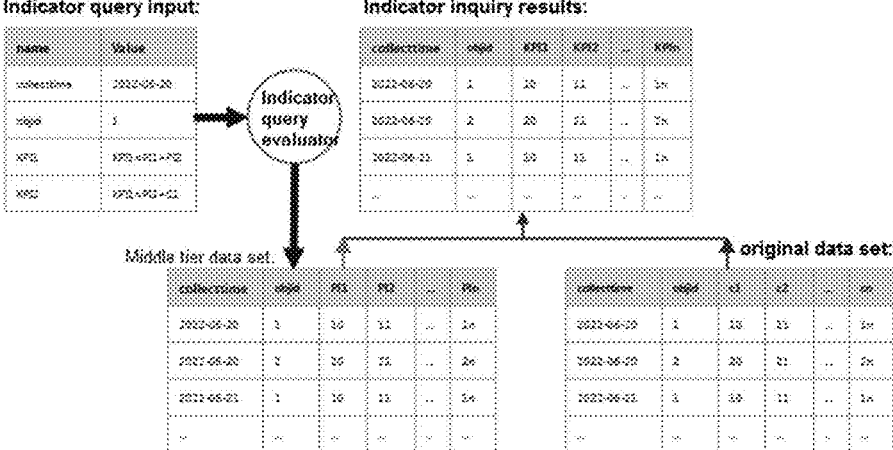
FIG. 6 is a schematic diagram of a process of querying for indicators according to another embodiment of the present disclosure.

A network element performance data analysis module executes a new query; a pre-computation query evaluator parses indicator, time and object information about the query; and if a pre-computation operation has been executed in an MT(Mot, T, Pii), a result is acquired from the MT, thereby realizing query acceleration. For example, referring to FIG. 6, when an indicator query is executed, an indicator query evaluator preferentially acquires data from an intermediate-layer data set based on an input condition, and if there is no intermediate-layer data, acquires data from an original data set, and finally forms an indicator query result.

Maintaining a pre-computation indicator model: as a system continuously runs, a pre-computation feature score dynamically changes; and a pre-computation indicator with a low score performs a refund operation, so that a system resource is reasonably used.

In an exemplary embodiment, a pre-computed model is dynamically maintained, and if no pre-computed indicator satisfies a condition, the pre-computed indicator is deleted from the pre-computed model and becomes a conventional indicator.

The indicator query system of the present disclosure analyzes characteristics of an indicator from the perspective of a service application, constructs an indicator acceleration layer by means of pre-computation, reduces the complexity of the indicator, improves the ease of use and throughput rate of the system, and reduces the overall resources of the system. A pre-computation indicator model and a dynamically constructed model are maintained by means of model driving, thereby improving the maintainability of the model.

Figure 7:
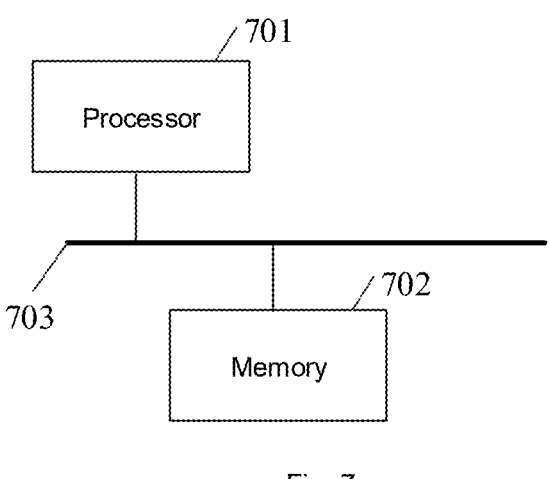
FIG. 7 is a structural diagram of an electronic device according to an embodiment of the present disclosure.

Based on the same concept, the present disclosure further provides an electronic device. As shown in FIG. 7, the electronic device mainly comprises: a processor 701, a memory 702 and a communication bus 703, wherein the processor 701 and the memory 702 complete communication with each other through the communication bus 703. The memory 702 stores a program that can be executed by the processor 701, and the processor 701 executes the program stored in the memory 702, so as to implement the following steps: acquiring an indicator query instruction, wherein the indicator query instruction carries an indicator name of a target indicator and target feature information about the target indicator; determining target operation information about a target indicator based on an indicator name, wherein the target operation information comprises a target operation parameter and a target operation rule; determining, from an indicator pre-computation data set, target feature information and indicator intermediate data corresponding to the target operation parameter, wherein the indicator pre-computation data set is obtained by means of pre-computation based on original indicator data; determining a query result of the target indicator based on the indicator intermediate data and the target operation rule.

The communication bus 703 mentioned in the electronic device may be a Peripheral Component Interconnect (PCI) bus, an Extended Industry Standard Architecture (EISA) bus, or the like. The communications bus 703 may be classified into an address bus, a data bus, a control bus, and the like. For ease of representation, only one thick line is shown in FIG. 7, but only one bus or one type of bus is not shown.

The memory 702 may include a random access memory (Random Access Memory; RAM for short), and may also include a non-volatile memory, for example, at least one disk memory. In an exemplary embodiment, the memory may also be at least one storage apparatus located far away from the foregoing processor 701.

The foregoing processor 701 may be a general processor, including a central processing unit (Central Processing Unit, CPU for short), a network processor (Network Processor, NP for short), and the like, and may also be a digital signal processor (Digital Signal Processing, DSP for short), an application specific integrated circuit (Application Specific Integrated Circuit, ASIC for short), a field programmable gate array (Field-Programmable Gate Array, FPGA for short), or another programmable logic device, a discrete gate, a transistor logic device, or a discrete hardware component.

Another embodiment of the present disclosure further provides a computer readable storage medium. The computer readable storage medium stores a computer program. When the computer program runs on a computer, the computer executes the method for querying an indicator described in the described embodiment.

The technical solution provided in the present disclosure has the following advantages compared with some situations. The method provided in the present disclosure comprises: acquiring an indicator query instruction, wherein the indicator query instruction carries an indicator name of a target indicator and target feature information about the target indicator; determining target operation information about a target indicator based on an indicator name, wherein the target operation information comprises a target operation parameter and a target operation rule; determining, from an indicator pre-computation data set, target feature information and indicator intermediate data corresponding to the target operation parameter, wherein the indicator pre-computation data set is obtained by means of pre-computation based on original indicator data; determining a query result of the target indicator based on the indicator intermediate data and the target operation rule. In this way, by setting an indicator pre-computation data set, when indicator query needs to be performed, indicator intermediate data for calculating a target indicator can be directly found from the indicator pre-computation data set, thereby reducing a search range in an indicator query process, and improving the query efficiency of the target indicator. The present invention can solve the problem that in some situations, the complexity of an indicator is difficult to control, thereby resulting in a complex indicator query process and low query efficiency.

In the embodiments described above, may be implemented in whole or in part by software, hardware, firmware, or any combination thereof. When implemented using software, it may be implemented in whole or in part in the form of a computer program product. The computer program product comprises one or more computer instructions. When the computer instruction is loaded and executed on the computer, a procedure or function according to the embodiments of the present application is totally or partially generated. The computer may be a general purpose computer, a special purpose computer, a computer network, or other programmable apparatus. The computer instructions may be stored on or transmitted from one computer-readable storage medium to another, for example, computer instructions are transmitted from one website, computer, server, or data center to another website, computer, server, or data center in a wired (e.g., coaxial cable, fiber, digital subscriber line (DSL)), or wireless (e.g., infrared, microwave, etc.) manner. The computer readable storage medium may be any available medium that can be accessed by a computer, or a data storage device such as a server, a data center, or the like that includes one or more available media arrays. The available media may be magnetic media (e.g., floppy disks, hard disks, magnetic tape, etc.), optical media (e.g., DVD), or semiconductor media (e.g., solid state drives), etc.

It should be noted that, in this specification, terms such as "first" and "second" are merely used to distinguish one entity or operation from another entity or operation, and do not necessarily require or imply any actual relationship or sequence between these entities or operations. Furthermore, the terms "include", "include", or any other variant thereof are intended to cover a non-exclusive inclusion, so that a process, a method, an article, or a device that includes a series of elements not only includes those elements, but also includes other elements that are not explicitly listed, or further includes elements inherent to the process, the method, the article, or the device. An element limited by "including a . . . " does not exclude other same elements existing in a process, a method, an article, or a device that includes the element, unless otherwise specified.

The foregoing descriptions are merely specific implementations of the present disclosure, so that those skilled in the art can understand or implement the present disclosure. Various modifications to these embodiments will be readily apparent to those skilled in the art, and the general principles defined herein may be implemented in other embodiments without departing from the spirit or scope of the present disclosure. Accordingly, the present disclosure will not be limited to the embodiments shown herein but is to be accorded the widest scope consistent with the principles and novel features applied herein.

What is claimed is:

1. An indicator query method, comprising:

acquiring an indicator query instruction, wherein the indicator query instruction carries an indicator name of a target indicator and target feature information about the target indicator;

determining target operation information about the target indicator based on the indicator name, wherein the target operation information comprises a target operation parameter and a target operation rule;

determining, from an indicator pre-computation data set, indicator intermediate data corresponding to the target operation parameter and the target feature information, wherein the indicator pre-computation data set is obtained by pre-computation based on original indicator data;

determining a query result of the target indicator based on the indicator intermediate data and the target operation rule;

wherein a process of pre-calculating the indicator pre-computation data set, based on the original indicator data comprises:

acquiring the original indicator data, wherein the original indicator data comprises original feature information about an indicator and original operation information about the indicator;

in cases where the original feature information satisfies a pre-computation condition, pre-calculating the original operation information to obtain at least one piece of the indicator intermediate data;

determining a set of corresponding relationships between the indicator intermediate data and the original feature information as the indicator pre-computation data set.

2. The method for querying an indicator according to claim 1, wherein the original operation information comprises an original operation parameter and an original operation rule between the original operation parameters;

the pre-computing the original operation information to obtain at least one piece of the indicator intermediate data comprises:

decomposing the original operation information into at least one sub-operation according to the original operation rule;

determining an operation result of each of the sub-operations as the indicator intermediate data.

3. The method for querying an indicator according to claim 1, wherein the pre-computation condition comprises at least one of the following: the original feature information comprises an indicator pre-computation identifier, an appearance frequency of the indicator is higher than a pre-set frequency, and computation complexity of the indicator is higher than pre-set complexity.

4. The method for querying an indicator according to claim 3, wherein the indicator pre-computation identifier is pre-set for the indicator and is used for indicating a query identifier of the indicator which needs to be pre-computed.

5. The method for querying an indicator according to claim 3, wherein the appearance frequency of the indicator is obtained by counting the number of times that the indicator appears in the query every day.

6. The method for querying an indicator according to claim 3, wherein the computation complexity of the indicator comprises computing the number of times that the indicator needs to be computed.

7. The method for querying an indicator according to claim 1, wherein before determining, from the indicator pre-computation data set, indicator intermediate data corresponding to the target computation parameter and the target feature information, the method further comprises:

determining that the indicator pre-computation data set corresponding to the target feature information exists.

8. The method for querying an indicator according to claim 7, wherein the determining that the indicator pre-computation data set corresponding to the target feature information exists comprises:

determining whether the target feature information satisfies a pre-computation condition;

in cases where the target feature information satisfies the pre-computation conditions, determine that the indicator pre-computation data set exists.

9. The method for querying an indicator according to claim 1, wherein the target operation parameter further comprises an original operation parameter, and before the determining a query result of the target indicator based on the intermediate data of the indicator, the method further comprises:

acquiring, from the original indicator data, original operation data corresponding to the original operation parameter, wherein the original operation parameter corresponding to the target feature information;

determining a query result of the target indicator based on the indicator intermediate data and the target operation rule, comprising:

determining a query result for the target indicator based on the original operation data, the indicator intermediate data and the target operation rule.

10. The method for querying an indicator according to claim 1, wherein the indicator query instruction may be triggered after a user inputs indicator-related information to be queried in the query interface, or generated based on selecting the indicator-related information to be queried in a pull-down menu option in the query interface.

11. The method for querying an indicator according to claim 10, wherein the indicator-related information is the indicator name and the target feature information.

12. An electronic device, comprising: a processor, a communication interface, a memory and a communication bus, wherein the processor, the communication interface and the memory complete mutual communication through the communication bus;

the memory is configured to store a computer program;

the processor is configured to execute the computer program stored in the memory to:

acquire an indicator query instruction, wherein the indicator query instruction carries an indicator name of a target indicator and target feature information about the target indicator;

determine target operation information about the target indicator based on the indicator name, wherein the target operation information comprises a target operation parameter and a target operation rule;

determine, from an indicator pre-computation data set, indicator intermediate data corresponding to the target operation parameter and the target feature information, wherein the indicator pre-computation data set is obtained by pre-computation based on original indicator data;

determine a query result of the target indicator based on the indicator intermediate data and the target operation rule;

wherein the processor is further configured to:

acquire the original indicator data, wherein the original indicator data comprises original feature information about an indicator and original operation information about the indicator;

in cases where the original feature information satisfies a pre-computation condition, pre-calculate the original operation information to obtain at least one piece of the indicator intermediate data;

determine a set of corresponding relationships between the indicator intermediate data and the original feature information as the indicator pre-computation data set.

13. The electronic device according to claim 12, the processor is further configured to:

pre-compute the original operation information to obtain at least one piece of the indicator intermediate data comprises:

decompose the original operation information into at least one sub-operation according to the original operation rule;

determine an operation result of each of the sub-operations as the indicator intermediate data.

14. The electronic device according to claim 12, wherein the pre-computation condition comprises at least one of the following: the original feature information comprises an indicator pre-computation identifier, an appearance frequency of the indicator is higher than a pre-set frequency, and computation complexity of the indicator is higher than pre-set complexity.

15. The electronic device according to claim 12, the processor is further configured to:

determine that the indicator pre-computation data set corresponding to the target feature information exists.

16. The electronic device according to claim 15, the processor is further configured to:

determining whether the target feature information satisfies a pre-computation condition;

in cases where the target feature information satisfies the pre-computation conditions, determine that the indicator pre-computation data set exists.

17. The electronic device according to claim 12, the processor is further configured to:

acquire, from the original indicator data, original operation data corresponding to the original operation parameter, wherein the original operation parameter corresponding to the target feature information;

determine a query result for the target indicator based on the original operation data, the indicator intermediate data and the target operation rule.

18. A non-transitory computer readable storage medium, storing a computer program, wherein the computer program is configured to, when executed by a processor, cause the processor to:

acquire an indicator query instruction, wherein the indicator query instruction carries an indicator name of a target indicator and target feature information about the target indicator;

determine target operation information about the target indicator based on the indicator name, wherein the target operation information comprises a target operation parameter and a target operation rule;

determine, from an indicator pre-computation data set, indicator intermediate data corresponding to the target operation parameter and the target feature information, wherein the indicator pre-computation data set is obtained by pre-computation based on original indicator data;

determine a query result of the target indicator based on the indicator intermediate data and the target operation rule;

wherein the computer program is further configured to cause the processor to:

acquire the original indicator data, wherein the original indicator data comprises original feature information about an indicator and original operation information about the indicator;

in cases where the original feature information satisfies a pre-computation condition, pre-calculate the original operation information to obtain at least one piece of the indicator intermediate data;

determine a set of corresponding relationships between the indicator intermediate data and the original feature information as the indicator pre-computation data set.

* * * * *